No. 799,766. PATENTED SEPT. 19, 1905.
H. R. VOLLAND.
PROCESS OF PRESERVING PLASTER AND OTHER BODIES FROM THE ACTION
OF MOISTURE.
APPLICATION FILED OCT. 17, 1904.
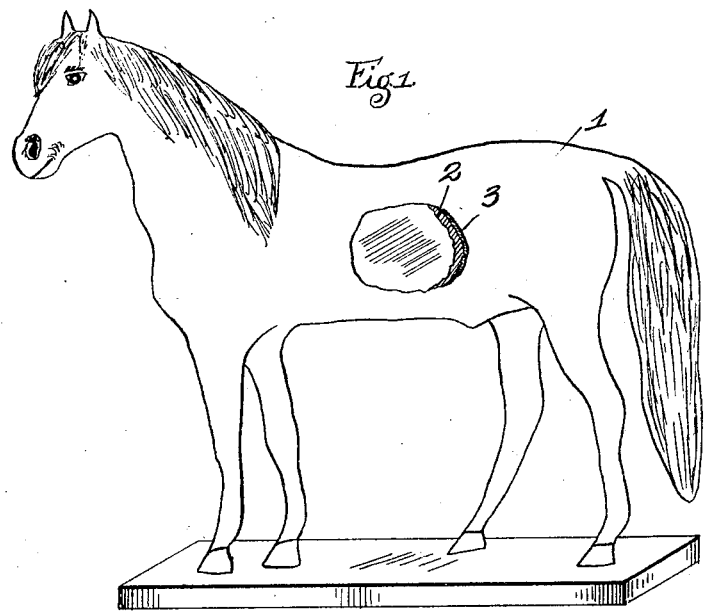
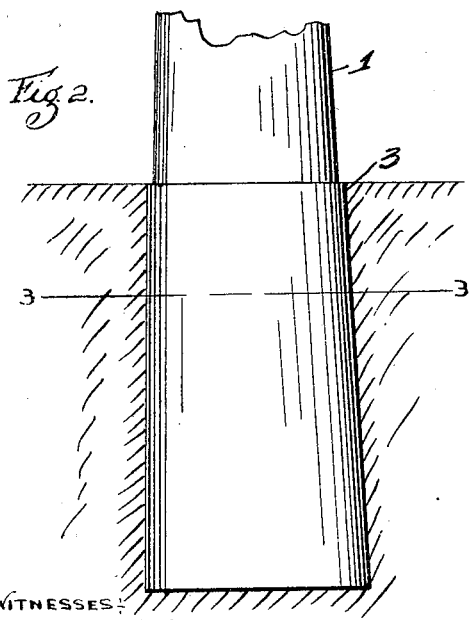
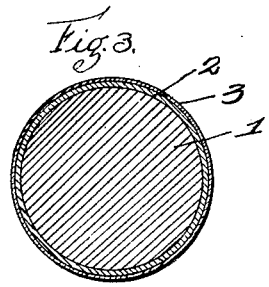

UNITED STATES PATENT OFFICE.

HUGO R. VOLLAND, OF ST. LOUIS, MISSOURI.

PROCESS OF PRESERVING PLASTER AND OTHER BODIES FROM THE ACTION OF MOISTURE.

No. 799,766.     Specification of Letters Patent.     Patented Sept. 19, 1905.

Application filed October 17, 1904. Serial No. 228,719.

*To all whom it may concern:*

Be it known that I, HUGO R. VOLLAND, a citizen of the United States, and a resident of St. Louis, Missouri, have invented certain new and useful Improvements in Processes of Preserving Plaster and other Bodies from the Action of Moisture, of which the following is a specification containing a full, clear, and exact description, reference being had to the accompanying drawings, forming a part hereof.

My invention relates to an improved process of preserving plaster and other bodies from the action of moisture; and the invention consists in the novel steps and mode of procedure hereinafter described and claimed.

Heretofore it has been difficult to protect from moisture plaster statuary, staff statuary, wood, stone, and metal bodies, and especially plaster statuary containing glue, as the same have been quickly damaged by the moisture of the atmosphere, notwithstanding they have been coated with paint and various other supposedly waterproof compounds.

My invention may be briefly described as consisting in, first, painting the statuary with a thin solution of sizing material—such as glue, starch, or resin, fresh paint, or any other suitable size—secondly, covering the body with a thin layer of metal, commercially known as "tin-foil," or a substitute therefor, and, finally, applying a coating of waterproof coloring-matter to the coating of sheet metal.

In the drawings, Figure 1 is a perspective view of a piece of plaster statuary constructed in accordance with my invention, a portion being broken away to disclose the various layers. Fig. 2 is a sectional elevation of a lower end of a post embedded in the ground and constructed in accordance with my protective process. Fig. 3 is a section on the line 3 3 of Fig. 2.

In carrying out my invention I first coat the statuary or other body 1 with a suitable size, as previously mentioned, then I place upon the size while sticky a metallic coating 2 composed of commercial tin-foil or its equivalent, and, finally, I place upon the tin-foil a coating of waterproof paint 3 of any desired color to suit the nature of the work upon which the process is employed. By thus treating the bodies above enumerated I make them practically water and moisture proof, and therefore indestructible, so far as the atmospheric moisture is concerned, and plaster statuary and the like will thereby be made much more valuable.

What I claim is—

The herein-described process of preserving plaster and other bodies from the action of moisture, which consists, first, in coating the body to be protected, with a thin solution of sizing material, such as glue or fresh paint, secondly, covering the body with a thin layer of metal, commercially known as tin-foil, or its equivalent while the sizing material is in a sticky condition, and finally, applying a coating of waterproof coloring-matter to the coating of sheet metal; substantially as specified.

In testimony whereof I have signed my name to this specification in presence of two subscribing witnesses.

HUGO R. VOLLAND.

Witnesses:
M. M. BRAZILL,
JOHN C. HIGDON.